US 9,490,459 B2

(12) United States Patent
Takizawa

(10) Patent No.: US 9,490,459 B2
(45) Date of Patent: Nov. 8, 2016

(54) VEHICULAR BATTERY PACK DEVICE

(71) Applicant: SUZUKI MOTOR CORPORATION, Hamamatsu-shi, Shizuoka (JP)

(72) Inventor: Koji Takizawa, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 301 days.

(21) Appl. No.: 14/221,080

(22) Filed: Mar. 20, 2014

(65) Prior Publication Data

US 2014/0302362 A1  Oct. 9, 2014

(30) Foreign Application Priority Data

Apr. 3, 2013   (JP) ................. 2013-077496

(51) Int. Cl.
| H01M 2/10 | (2006.01) |
|---|---|
| H01M 2/02 | (2006.01) |
| B60K 1/04 | (2006.01) |
| H01M 10/625 | (2014.01) |
| H01M 10/613 | (2014.01) |
| H01M 10/6562 | (2014.01) |
| B60K 11/06 | (2006.01) |
| B60K 1/00 | (2006.01) |

(52) U.S. Cl.
CPC ............ *H01M 2/1077* (2013.01); *B60K 1/04* (2013.01); *H01M 2/1083* (2013.01); *H01M 10/613* (2015.04); *H01M 10/625* (2015.04); *H01M 10/6562* (2015.04); *B60K 11/06* (2013.01); *B60K 2001/005* (2013.01); *B60K 2001/0416* (2013.01); *H01M 2220/20* (2013.01)

(58) Field of Classification Search
CPC ......... H01M 2/1077; H01M 2/10183; H01M 2/02; H01M 10/625; H01M 10/613; B60K 1/04

See application file for complete search history.

(56) References Cited

U.S. PATENT DOCUMENTS 4,846,295 A * 7/1989 Shepard .............. H01M 2/1083
  180/216
5,392,873 A  2/1995 Masuyama et al. ......... 180/68.5
(Continued)

FOREIGN PATENT DOCUMENTS

| CN | 102216100 A | 10/2001 |
|---|---|---|
| CN | 1572559 A | 2/2005 |

(Continued)

OTHER PUBLICATIONS

Chinese Office Action with search report dated Jan. 6, 2016, issued by the Chinese Patent Office in corresponding application 201410119675.X.

*Primary Examiner* — Kenneth Douyette

(74) *Attorney, Agent, or Firm* — Stein IP, LLC

(57) ABSTRACT

A battery pack device in which a battery module is incorporated in a battery case and a rear floor panel is disposed between a rear seat and a back panel that is disposed in a rear of the rear seat, and which is mounted on a vehicle body via a subframe so as to be disposed in an opening of the rear floor panel, and is provided with an air intake duct through which to send a cooling wind to inside the battery case and an air discharge duct through which to discharge air from inside the battery case, wherein the subframe is provided as defined herein, a bottom cover is attached to the subframe as defined herein, a rear end portion of the bottom cover is provided as defined herein, and an air outlet of the air discharge duct is opened as defined herein.

8 Claims, 7 Drawing Sheets

(56) References Cited

U.S. PATENT DOCUMENTS

| | | | |
|---|---|---|---|
| 5,501,289 A * | 3/1996 | Nishikawa | B60K 1/04 180/65.1 |
| 5,643,691 A * | 7/1997 | Iwatsuki et al. | H01M 2/1211 429/54 |
| 7,051,825 B2 | 5/2006 | Masui et al. | 180/68.5 |
| 7,396,075 B2 | 7/2008 | Ohkuma et al. | 297/180.1 |
| 7,815,250 B2 | 10/2010 | Oshio et al. | 296/204 |
| 7,905,307 B2 | 3/2011 | Kubota et al. | 180/68.1 |
| 2004/0235315 A1 | 11/2004 | Masui et al. | 439/34 |
| 2007/0040418 A1 | 2/2007 | Ohkuma et al. | 297/15 |
| 2007/0238015 A1 * | 10/2007 | Kubota et al. | H01M 10/4207 429/120 |
| 2008/0000703 A1 * | 1/2008 | Shindou | B60K 1/04 180/68.5 |
| 2008/0062622 A1 * | 3/2008 | Fukazu et al. | B60K 1/04 361/678 |
| 2009/0102220 A1 | 4/2009 | Oshio et al. | 296/39.1 |
| 2010/0099019 A1 * | 4/2010 | Nagata | B60K 1/04 429/120 |
| 2010/0276220 A1 | 11/2010 | Kubota et al. | 180/68.1 |
| 2011/0222240 A1 | 9/2011 | Kawata et al. | 360/690 |

FOREIGN PATENT DOCUMENTS

| | | |
|---|---|---|
| CN | 1899883 A | 1/2007 |
| CN | 101909916 A | 12/2010 |
| JP | 2009-96438 A | 5/2009 |
| JP | 2010-285151 A | 12/2010 |

* cited by examiner

VEHICULAR BATTERY PACK DEVICE

CROSS-REFERENCE TO RELATED APPLICATIONS

This application claims the benefit of Japanese Patent Application JP 2013-077496, filed Apr. 3, 2013, in the Japanese Patent Office. All disclosures of the document(s) named above are incorporated herein by reference.

BACKGROUND OF THE INVENTION

1. Field of the Invention

The present invention relates to a vehicular battery pack device. More specifically, the invention relates to a battery pack device that is incorporated in a hybrid vehicle an electric vehicle.

2. Description of the Related Art

A structure is known in which a cooling air discharge outlet of a power unit is opened on the front side of a rear bumper (refer to JP-A-2010-285151, for example). In this structure, the space interposed between the cooling air discharge outlet and the rear bumper is open on the bottom side. Therefore, liquid such as rain water or cleaning water may flow into the power unit through the cooling air discharge outlet to wet it while the vehicle is running or being washed. Furthermore, while the vehicle is running, travel wind may go into the space between the power unit and the rear bumper and impair the flow of cooling air around the cooling air discharge outlet, possibly lowering the performance of the cooling of a battery module that is incorporated in a battery pack. A structure in which a bottom cover is provided under the bottom surface of a vehicle to prevent entrance of travel wind is known (refer to JP-A-2009-96438, for example).

SUMMARY OF THE INVENTION

If a bottom cover as mentioned above is provided to prevent entrance of travel wind into the space adjacent to the cooling air discharge outlet of a power unit, vibration would tend to be transmitted to the bottom cover from the rear bumper made of a thin material and cooling air that is discharged from the cooling air discharge outlet could not easily be ejected to the outside of the vehicle (i.e., it would be prone to stay in the vicinity of the cooling air discharge outlet). As a result, when the vehicle is stopped or the rotation of a cooling fan is stopped, a warm wind would likely flow into the power unit through the cooling air discharge outlet, causing reduction in the performance of the cooling of the battery module.

The present invention has been made to solve the above problems, and an object of the invention is to provide a vehicular battery pack device which enhances the performance of the cooling of a battery module incorporated in a battery pack while preventing the battery pack from being exposed to water.

An embodiment of the present invention is directed to a battery pack device in which a battery module is incorporated in a battery case and a rear floor panel is disposed between a rear seat and a back panel that is disposed in the rear of the rear seat, and which is mounted on a vehicle body via a subframe so as to be disposed in an opening of the rear floor panel, and is provided with an air intake duct through which to send a cooling wind to inside the battery case and an air discharge duct through which to discharge air from inside the battery case, characterized in: that the subframe has a support frame which surrounds the battery case and a support member which is attached to a rear end portion of the support frame so as to extend downward so that its bottom end portion is located below a bottom-front portion of a rear bumper; that a bottom cover is attached to the subframe so as to cover a bottom portion of the battery case; that a rear end portion of the bottom cover is provided with a guide plate which covers a bottom portion of a space interposed between the battery case and the rear bumper, is opposed to the rear bumper with a gap formed in between, and is supported by the bottom end portion of the support member; and that an air outlet of the air discharge duct is opened in a first space that is surrounded by the guide plate, the rear bumper, a rear side surface of the battery case, a rear side surface of the support member, and the rear floor panel.

As the above embodiment, it is preferable that second spaces are formed outside two respective end portions, in the vehicle width direction, of the guide plate so as to have respective openings in front of the rear bumper at the bottom of the vehicle; that the air outlet is opened at the center of the first space in the vehicle width direction, and back panel is disposed between the air outlet and the rear bumper in the vehicle front-rear direction so as to extend in the vehicle width direction; and that the back panel is formed with first slant surfaces which extend approximately in the vehicle width direction and incline rearward as the position goes outward in the vehicle width direction so as to extend from a position opposed to the air outlet to positions adjacent to the second spaces, respectively.

As the above embodiment, it is preferable that the back panel is formed with a second slant surface which extends approximately in the vehicle top-bottom direction and inclines rearward as the position goes downward so as to extend from a position opposed to the air outlet to a position adjacent to the gap.

As the above embodiment, it is preferable that the support member inclines so that its bottom portion is located in the rear of its top portion, and a rear slant surface of the support member is set parallel with the second slant surface of the back panel.

As the above embodiment, it is preferable that a shield plate is attached to the support member so as to cover the support member from behind in the vehicle front-rear direction and to extend from a position approximately the same in height as the support frame to the guide plate.

The invention can realize a vehicular battery pack device which enhances the performance of the cooling of a battery module incorporated in a battery pack while preventing the battery pack from being exposed to water.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DESCRIPTION OF SYMBOLS

Figure 1:
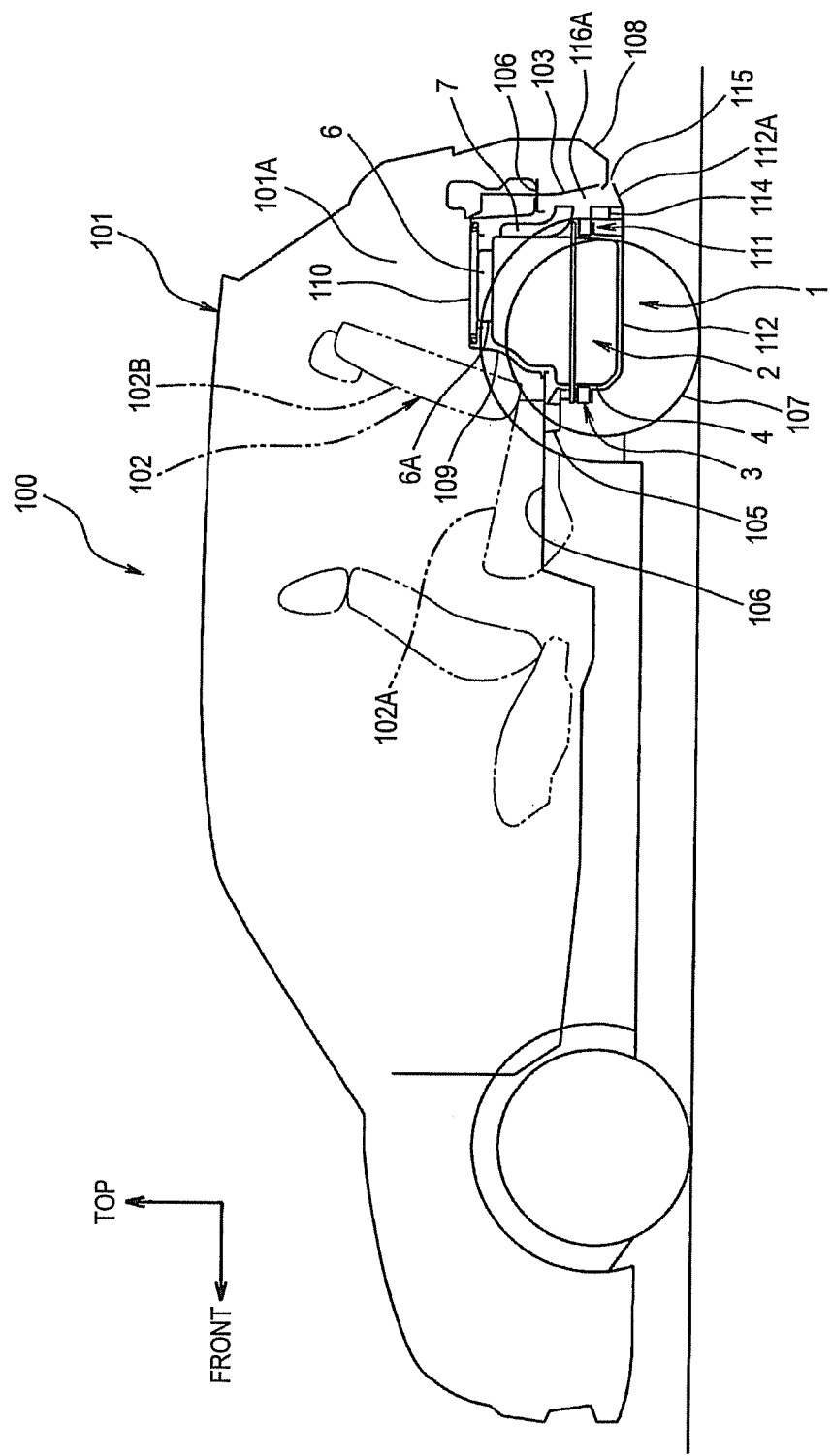
FIG. 1 is a side view of a vehicle which incorporates a vehicular battery pack device according to an embodiment of the present invention.

1: Battery pack device (vehicular battery pack device)
2: Battery pack
3: Attachment unit
4: Battery case
4R: Rear wall
5: Battery module
6: Air intake duct
7: Air discharge duct
7A: Air outlet
100: Vehicle
101: Vehicle rear part
101A: Trunk
102: Rear seat
103: Back panel
103A: First slant surface
103B: Second slant surface
104: Rear side member
105: Cross member
106: Rear floor panel
106A: Opening
108: Rear bumper
111: Subframe
112: Bottom cover
112A Guide plate
113: Support frame
114: Support member
115: Gap
116A: First space
116B: Second space
117: Shield plate
F1: Travel wind
F2: Cooling wind

DETAILED DESCRIPTION OF THE EMBODIMENTS

A vehicular battery pack device (hereinafter referred to as a battery pack device) according to an embodiment of the present invention, which is to be incorporated in such a vehicle as a hybrid vehicle or an electric vehicle, will be hereinafter described in detail with reference to the drawings. In the embodiment, for convenience of description, the front direction, the left/right direction, and the top/bottom direction are indicated by arrows in the drawings.

[General Configuration of Vehicle]

Figure 2:
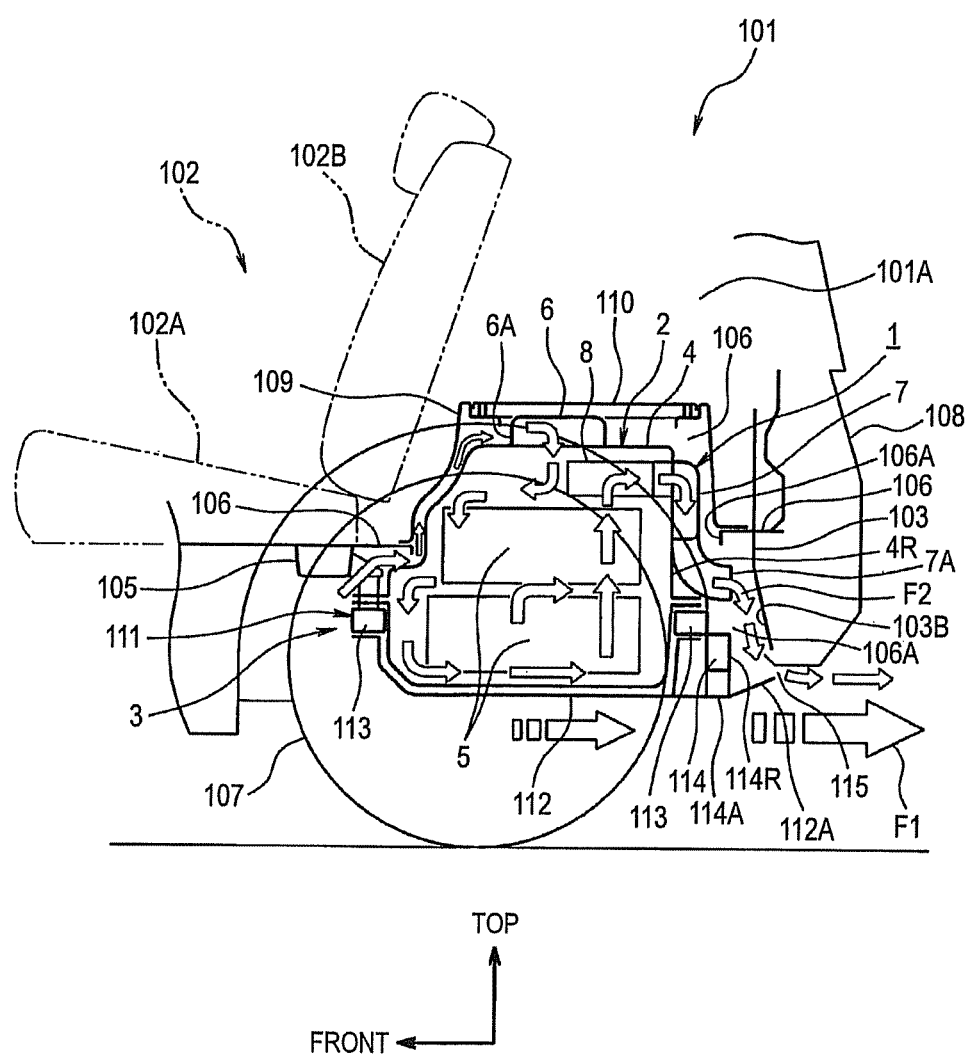
FIG. 2 is a side view of a rear part of the vehicle which incorporates the vehicular battery pack device according to an embodiment.

As shown in FIGS. 1 and 2, a battery pack device 1 is disposed between a rear seat 102 and a back panel 103 in a rear part 101 of a vehicle 100. As shown in FIG. 2, the battery pack device 1 includes a battery pack 2 and an attachment unit 3. The rear part 101 is equipped with a seat cushion 102A and a seat back 102B. Therefore, stated more specifically, the battery pack device 1 is disposed in the rear of the seat cushion 102A. Reference symbol 101A denotes a trunk.

Figure 3:
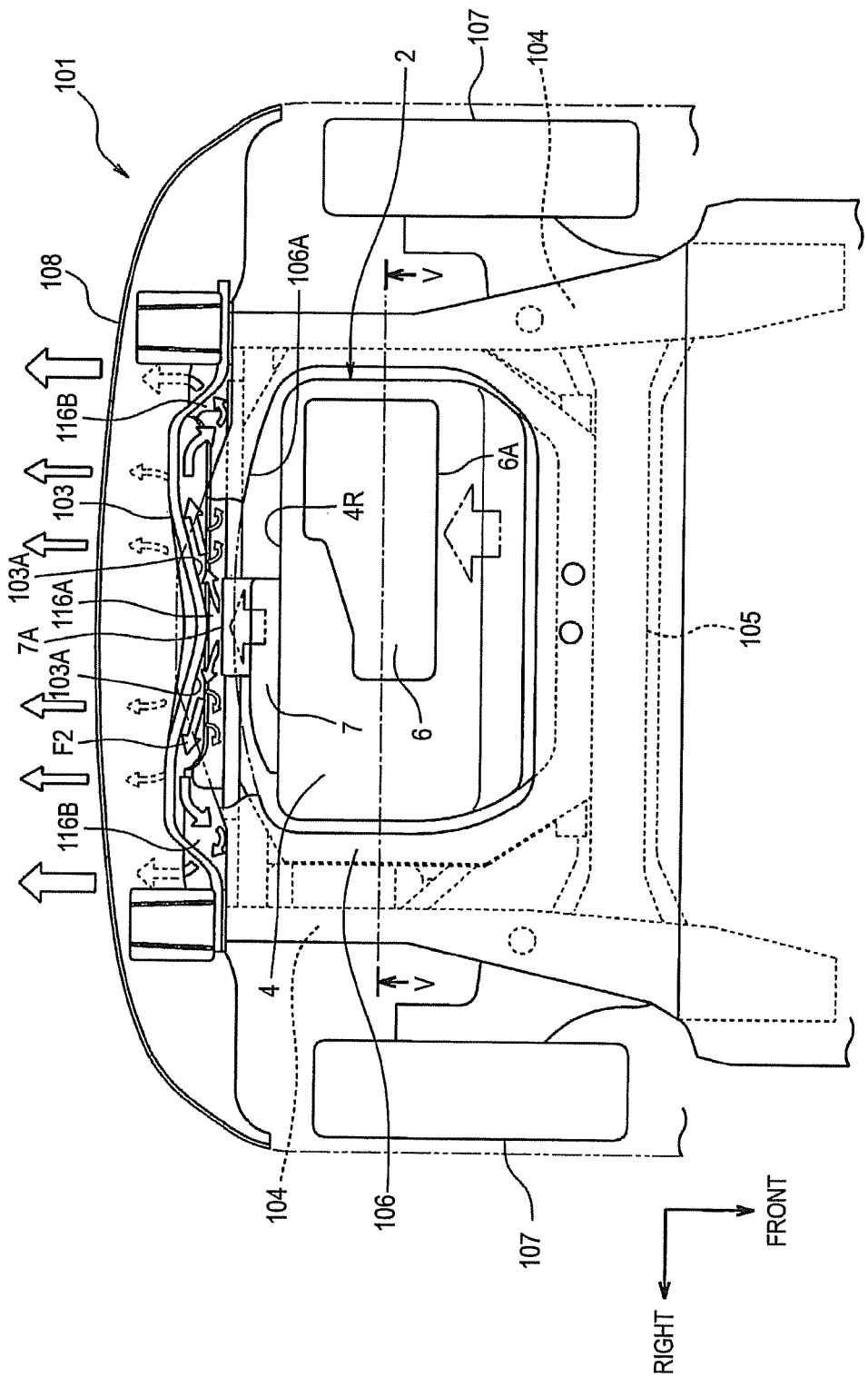
FIG. 3 is a plan view of the rear part of the vehicle which incorporates the vehicular battery pack device according to an embodiment.
Figure 4:
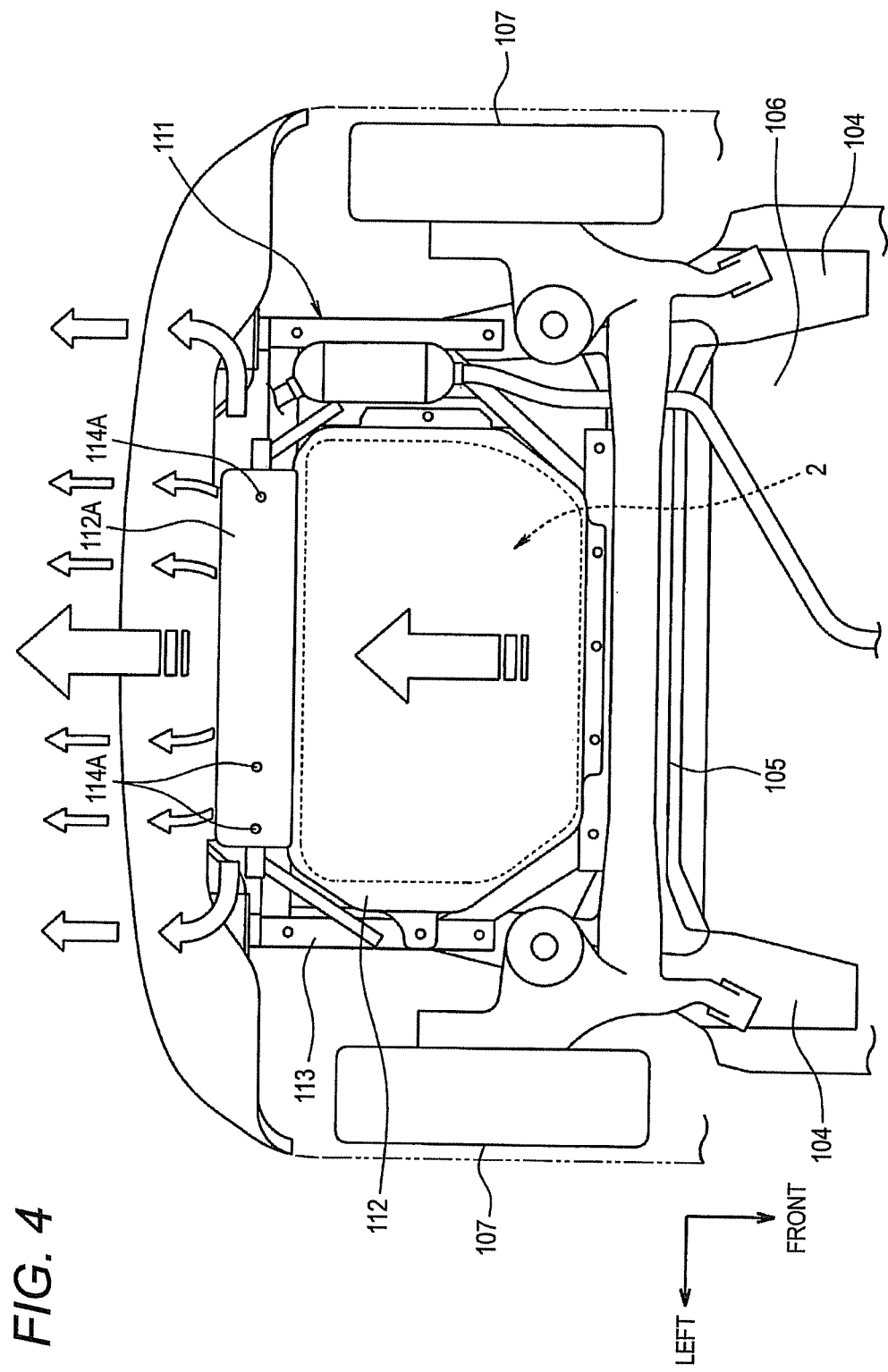
FIG. 4 is a bottom view of the rear part of the vehicle which incorporates the vehicular battery pack device according to an embodiment.

As shown in FIG. 3, a pair of rear side members 104 are disposed on the two respective sides of the rear part 101 in the vehicle width direction so as to extend in the vehicle front-rear direction. Middle portions of the rear side members 104 are connected to each other by a cross member 105 which extend in the vehicle width direction. A rear floor panel 106 is disposed over the pair of rear side members 104 and the cross member 105. A pair of rear wheels 107 are provided on the two respective sides of the rear part 101 in the vehicle width direction. As shown in FIGS. 1 and 2, a rear bumper 108 is disposed in the rear of the rear floor panel 106 so as to extend in the vehicle width direction. The above-mentioned back panel 103 is disposed in front of the rear bumper 108.

As shown in FIGS. 2 and 3, the rear floor panel 106 is formed with a generally rectangular opening 106A in which a top portion of the battery pack 2 is inserted. In the embodiment, in particular, a gap is formed between a rear rim portion of the opening 106A and the rear surface of the battery pack 2 which is disposed inside the opening 106A, over the entire length of the rear surface of the battery pack 2 in the vehicle width direction. A roughly rectangular cover member 109 is disposed over the opening 106A so as to cover a top portion of the battery pack 2 which has been inserted from below and set in place. A bottom portion of the cover member 109 is fixed (joined) to the rim of the opening 106A. A top opening 109A of the cover member 109 is closed by a lid member 110.

[Battery Pack Device]

Figure 5:
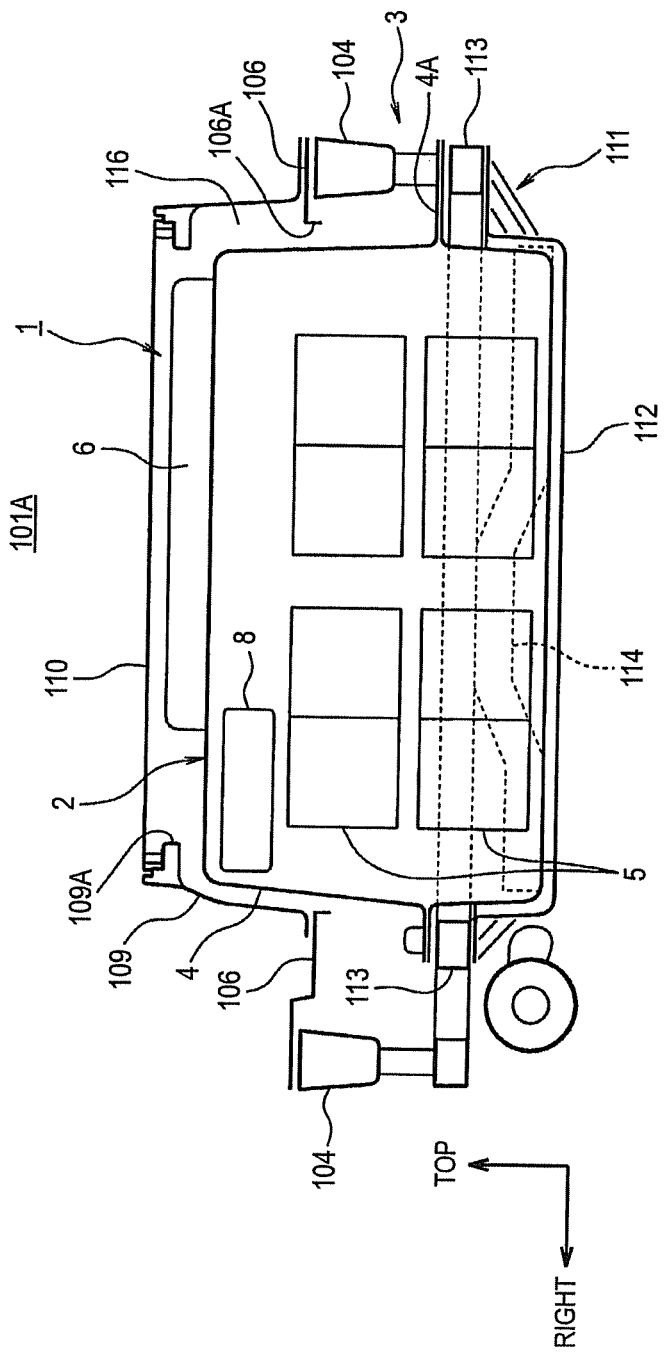
FIG. 5 is a sectional view taken along line V-V in FIG. 3.

In the battery pack 2, a battery module 5 is incorporated in a battery case 4. As shown in FIGS. 2 and 3, a top wall of the battery case 4 is provided with an air intake duct 6 through which to send a cool wind (air) to inside the battery case 4. In the embodiment, the air intake duct 6 is formed, on the front side, with an air inlet 6A for introducing cool air from the outside. A rear wall 4R of the battery case 4 is provided with an air discharge duct 7 having an air outlet 7A through which to discharge air from inside the battery case 4. As shown in FIGS. 2 and 5, a cooling fan 8 is disposed inside the battery case 4. A cooling wind that is introduced into the battery case 4 through the air intake duct 6 is guided so as to circulate the inside of the battery case 4, and then discharged by the cooling fan 8 through the air discharge duct 7 and the air outlet 7A.

The attachment unit 3 serves to attach the battery pack 2 to the vehicle body, that is, the bottom surface of the rear floor panel 106. As shown in FIGS. 2 and 5, the attachment unit 3 is made from a subframe 111 and a bottom cover 112. The subframe 111 is attached to the rear side members 104 and the cross member 105. The subframe 111 has a support frame 113 which is disposed so as to surround the battery case 4 and a support member 114 which is attached to a rear end portion of the support frame 113 so as to extend downward so that its bottom end portion is located below a bottom-front portion of the rear bumper 108. A circumferential flange 4A of the battery case 4 is fixed to the support frame 113.

As shown in FIG. 2, the bottom cover 112 is attached to the support member 114 of the subframe 111 so as to cover a bottom portion of the battery case 4. The bottom cover 112 covers a bottom portion of a space 116 that is interposed between the battery case 4 and the rear bumper 108. A guide plate 112A extends from the rear end of the bottom cover 112 (the former is continuous with the latter) so as to be opposed to the bottom-front portion of the rear bumper 108 with a gap 115 formed in between. In the embodiment, the guide plate 112A is set so as to incline upward as the position goes rearward.

As shown in FIG. 2, the guide plate 112A is connected to a bottom end portion of the support member 114 of the subframe 111 by link members 114A. The space that is enclosed by the guide plate 112A, the rear bumper 108, a rear wall 4R of the battery case 4, a rear wall 114R of the support member 114, and the rear floor panel 106 is referred to as a first space 116A. The air outlet 7A of the air discharge duct 7 is opened in the first space 116A.

As shown in FIG. 3, second spaces 116B are formed outside two respective end portions, in the vehicle width direction, of the guide plate 112A so as to have respective openings in front of the rear bumper 108 at the bottom of the vehicle 100. That is, the second spaces 116B are formed outside the first space 116A in the vehicle width direction. As shown in FIGS. 2 and 3, the air outlet 7A of the air discharge duct 7 is opened at the center of the first space 116A in the vehicle width direction. The above-mentioned back panel 103 is disposed between the air outlet 7A and the rear bumper 108 in the vehicle front-rear direction so as to extend in the vehicle width direction. As shown in FIG. 3, the back panel 103 is formed with first slant surfaces 103A which extend approximately in the vehicle width direction and incline rearward as the position goes outward in the vehicle width direction (i.e., extend from the position opposed to the air outlet 7A to the positions adjacent to the second spaces 116B, respectively). As shown in FIG. 2, the back panel 103 is also formed with a second slant surface 103B which extends approximately in the vehicle top-bottom direction and inclines rearward as the position goes downward (i.e., extends from a position opposed to the air outlet 7A to a position adjacent to the gap 115).

[Workings and Advantages]

In the battery pack device 1 according to the embodiment, the guide plate 112A is supported by the support member 114 via the link members 114A, whereby the bottom cover 112 can be fixed to the support member 114 with the gap 115 formed between the bottom cover 112 and the rear bumper 108. Furthermore, in the battery pack device 1 according to the embodiment, the bottom portion, interposed between the battery case 4 and the rear bumper 108, of the first space 116A can be covered with the guide plate 112A (which is attached stably to the support member 114) in a state that a constant gap is formed between the rear bumper 108 and the guide plate 112A. Therefore, in the battery pack device 1, as shown in FIG. 2, while the vehicle 100 is running, a travel wind F1 that flows under the vehicle 100 smoothly flows rearward parallel with the bottom surface of the guide plate 112A. As a result, the travel wind F1 can be prevented from flowing into the first space 116A through the gap 115, whereby a cooling wind F2 that is discharged from the air outlet 7A can easily be ejected from the vehicle 100.

In the embodiment, as shown in FIG. 2, the air outlet 7A of the air discharge duct 7 is opened in the first space 116A. A cooling wind F2 that is discharged from the air outlet 7A flows through the first space 116A and is sucked out by the negative pressure that is produced by a travel wind F1 that flows under the guide plate 112A.

The support member 114 is attached to the rear end portion of the support frame 113 and its bottom end portion is located below the bottom-front portion of the rear bumper 108. And the support member 114 extends parallel with the bottom-front portion of the rear bumper 108 in the vehicle width direction. Therefore, the support member 114 can serve as part of the air discharge passage and prevent a cooling wind F2 from flowing toward the battery case 4 when it flows toward the gap 115 after being discharged from the air outlet 7A. Therefore, entrance of discharge air into the battery case 4 can be prevented and a cooling wind F2 discharged from the air outlet 7A can be put into a smooth stream. As a result, the cooling wind F2 discharged from the air outlet 7A of the air discharge duct 7 is allowed to flow smoothly to the outside of the vehicle 100 and the performance of the cooling of the battery module 5 can thereby be enhanced.

In the embodiment, since the guide plate 112A is provided, while the vehicle 100 is running, a travel wind F1 is allowed to smoothly flow rearward under the guide plate 112A. When a cooling wind F2 discharged from the air outlet 7A passes through the gap 115, it can be pulled out of the first space 116A to the outside through the gap 115 by the flow of the travel wind F1. This prevents a cooling air from staying the first space 116A and prevents a cooling air F2 from flowing reversely into the battery case 4 from the first space 116A via the air discharge duct 7. As a result, in the embodiment, the performance of the cooling of the battery module 5 can be enhanced further.

In the battery pack device 1 according to the embodiment, the rear end portion of the guide plate 112A and the bottom-front portion of the rear bumper 108 coextend (spaced from each other in the vehicle top-bottom direction). Therefore, in the vehicle 100 having the battery pack device 1, rain water or water used for washing it is not prone to reach the air outlet 7A directly and hence can be prevented from flowing into the battery case 4 through the air outlet 7A. Thus, in the embodiment, entrance of water into the battery case 4 can be prevented.

In the embodiment, the guide plate 112A is supported stably by the support member 114. Therefore, deformation of the guide plate 112A can be prevented even if certain water pressure acts on the guide plate 112A due to, for example, splashing of water used for washing the vehicle 100 or splashing of rain water during running of the vehicle 100. As a result, the gap 115 between the guide plate 112A and the rear bumper 108 can be prevented from being deformed to a large extent and thereby enlarged, whereby entrance of water or the like is made less likely to enter the first space 116A and resulting entrance of water into the battery case 4 can be prevented.

In the battery pack device 1 according to the embodiment, part of a cooling wind F2 discharged from the air outlet 7A can be distributed equally to both sides of the air outlet 7A in the vehicle width direction and be guided to the second spaces 116B parallel with the first slant surfaces 103A of the back panel 103. In this manner, the part of the cooling wind F2 discharged from the air outlet 7A can be discharged to the outside of the vehicle 100 via the second spaces 116B, whereby the efficient of ejection of the cooling wind F2 to the outside of the vehicle 100 can be increased. Therefore, a cooling wind F2 discharged from the air outlet 7A can be prevented from staying in the vicinity of the air outlet 7A or in the first space 116A. As a result, a phenomenon can be prevented that a warm wind enters the battery case 4 via the air outlet 7A and the air discharge duct 7 when, for example, the vehicle 100 is stopped or the rotation of the cooling fan 8 which is incorporated in the battery case 4 is stopped. Thus, the performance of the cooling of the battery module 5 can be enhanced.

In the battery pack device 1 according to the embodiment, part of a cooling wind F2 discharged from the air outlet 7A can reliably be guided parallel with the second slant surface 103B of the back panel 103 to the vicinity of the gap 115 between the rear bumper 108 and the guide plate 112A, whereby the efficiency of discharge of the cooling wind F2 to the outside of the vehicle 100 can be increased reliably. As a result, the ventilation performance in the first space 116A can be enhanced. A phenomenon can be prevented that a warm wind enters the battery case 4 through the air outlet 7A when the vehicle 100 is stopped or the rotation of the cooling fan 8 is stopped. Thus, the performance of the cooling of the battery module 5 can be enhanced.

[Modification]

Figure 6:
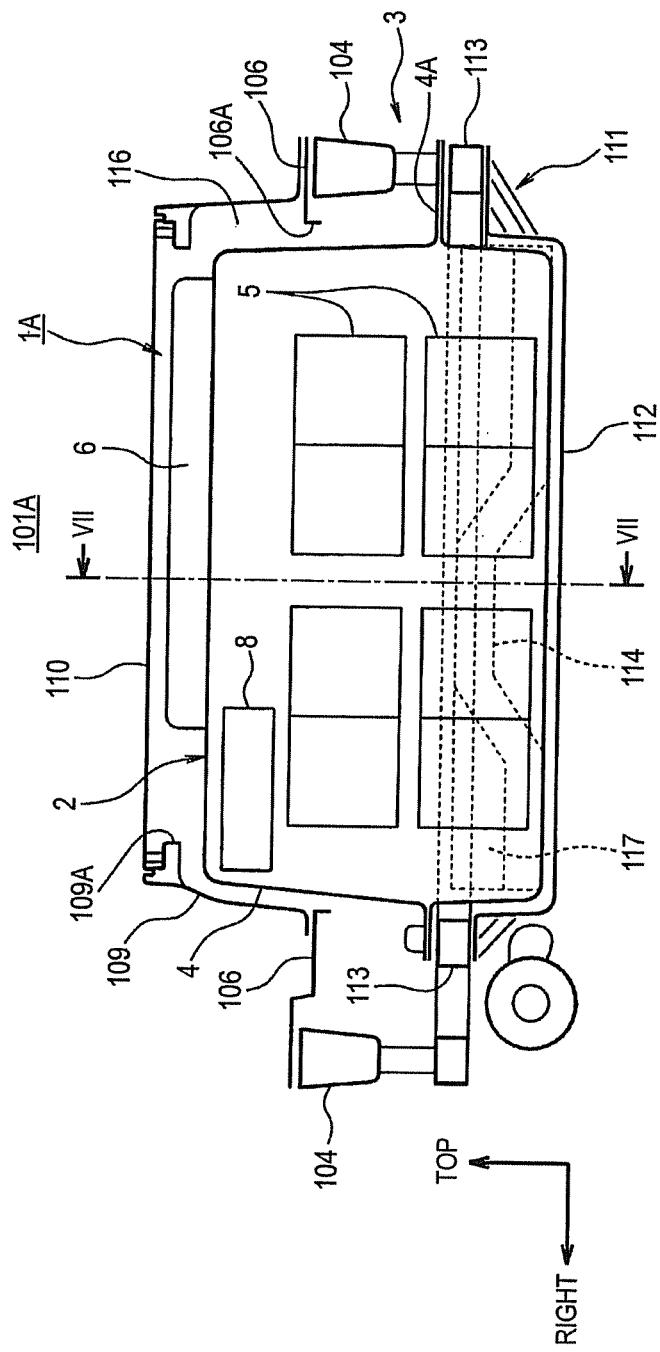
FIG. 6 is a sectional view of a rear part of a vehicle incorporating a vehicular battery pack device according to a modification of the embodiment.
Figure 7:
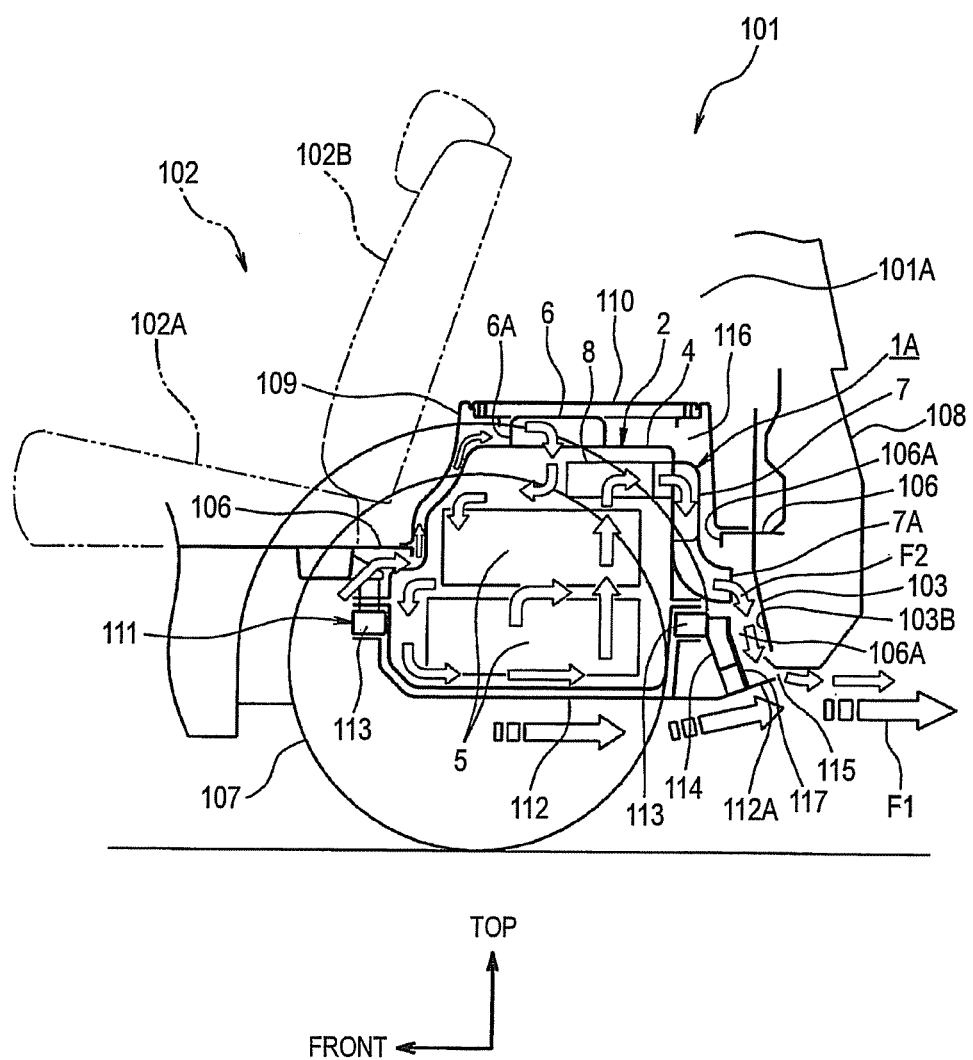
FIG. 7 is a side view of the vehicular battery pack device according to the modification in which a support member is provided with a shield plate.

FIGS. 6 and 7 show a modification of the battery pack device 1 according to the embodiment of the invention. In the following description of the modification, only different units, members, etc. than of the battery pack device 1 according to the embodiment will be described.

As shown in FIG. 7, in a battery pack device 1A according to the modification, the support member 114 is inclined. More specifically, the support member 114 inclines so that its bottom portion is located in the rear of its top portion. In this modification, the rear slant surface of the support member 114 is set parallel with the second slant surface 103B. Furthermore, a shield plate 117 is attached to the support member 114 so as to cover the support member 114 from behind in the vehicle front-rear direction and to extend from a position approximately the same in height as the support frame 113 to the guide plate 112A. This modification is the same as the embodiment in the other part of the configuration.

With the above structure, a flow passage for a cooling wind F2 discharged from the air outlet 7A can be formed by the rear slant surface of the support member 114 and the second slant surface 103B of the back panel 103. Therefore, a cooling wind F2 discharged from the air outlet 7A can be guided to the gap 115 by the rear slant surface of the support member 114 and the second slant surface 103B of the back panel 103. As a result, also in this modification, the cooling wind F2 can be discharged reliably to the outside of the vehicle 100 through the gap 115. In particular, in the modification, by virtue of the shield plate 117 which is attached to the rear surface of the support member 114, a cooling wind F2 discharged from the air outlet 7A is not prone to leak toward the battery pack 2 when flowing into the space between the support member 114 and the second slant surface 103B. And a cooling wind leaking from the first space 116A is not prone to flow toward the air inlet 6A of the air intake duct 6. Furthermore, since the shield plate 117 is attached utilizing the support member 14, the shield plate 117 can be fixed stably. A cooling wind F2 discharged from the air outlet 7A can be guided to the gap 115 more easily, whereby the efficiency of discharge of the cooling wind F2 to the outside of the vehicle can be increased.

[Other Modifications]

Although the embodiment and modification have been described above, the invention is not limited to them and further various modifications are possible. For example, although in the embodiment the guide plate 112A inclines upward as the position goes rearward, it may be set flush with the bottom cover 112.

What is claimed is:

1. A battery pack device in which a battery module is incorporated in a battery case and a rear floor panel is disposed between a rear seat and a back panel that is disposed in a rear of the rear seat, and which is mounted on a vehicle body via a subframe so as to be disposed in an opening of the rear floor panel, and is provided with an air intake duct through which to send a cooling wind to inside the battery case and an air discharge duct through which to discharge air from inside the battery case, wherein:

the subframe has a support frame which surrounds the battery case and a support member which is attached to a rear end portion of the support frame so as to extend downward so that its bottom end portion is located below a bottom-front portion of a rear bumper;

a bottom cover is attached to the subframe so as to cover a bottom portion of the battery case;

a rear end portion of the bottom cover is provided with a guide plate which covers a bottom portion of a space interposed between the battery case and the rear bumper, is opposed to the rear bumper with a gap formed in between, and is supported by the bottom end portion of the support member; and an air outlet of the air discharge duct is opened in a first space that is surrounded by the guide plate, the rear bumper, a rear side surface of the battery case, a rear side surface of the support member, and the rear floor panel.

2. The battery pack device according to claim 1, wherein:

second spaces are formed outside two respective end portions, in the vehicle width direction, of the guide plate so as to have respective openings in front of the rear bumper at the bottom of the vehicle;

the air outlet is opened at the center of the first space in the vehicle width direction, and back panel is disposed between the air outlet and the rear bumper in the vehicle front-rear direction so as to extend in the vehicle width direction; and the back panel is formed with first slant surfaces which extend in the vehicle width direction and incline rearward as the position goes outward in the vehicle width direction so as to extend from a position opposed to the air outlet to positions adjacent to the second spaces, respectively.

3. The battery pack device according to claim 2, wherein the back panel is formed with a second slant surface which extends in the vehicle top-bottom direction and inclines rearward as the position goes downward so as to extend from a position opposed to the air outlet to a position adjacent to the gap.

4. The battery pack device according to claim 3, wherein the support member inclines so that its bottom portion is located in the rear of its top portion, and a rear slant surface of the support member is set parallel with the second slant surface of the back panel.

5. The battery pack device according to claim 1, wherein a shield plate is attached to the support member so as to cover the support member from behind in the vehicle front-rear direction and to extend from a position the same in height as the support frame to the guide plate.

6. The battery pack device according to claim 2, wherein a shield plate is attached to the support member so as to cover the support member from behind in the vehicle front-rear direction and to extend from a position the same in height as the support frame to the guide plate.

7. The battery pack device according to claim 3, wherein a shield plate is attached to the support member so as to cover the support member from behind in the vehicle front-rear direction and to extend from a position the same in height as the support frame to the guide plate.

8. The battery pack device according to claim 4, wherein a shield plate is attached to the support member so as to cover the support member from behind in the vehicle front-rear direction and to extend from a position the same in height as the support frame to the guide plate.

\* \* \* \* \*